William P. Bovard
METHOD OF MANUFACTURING RAIL BONDS.
APPLICATION FILED FEB. 10, 1921.

1,394,604.   Patented Oct. 25, 1921.

Witness
H. J. Stromberger.

Inventor
William P. Bovard.

UNITED STATES PATENT OFFICE.

WILLIAM P. BOVARD, OF MANSFIELD, OHIO, ASSIGNOR TO THE OHIO BRASS COMPANY, OF MANSFIELD, OHIO, A CORPORATION OF NEW JERSEY.

METHOD OF MANUFACTURING RAIL-BONDS.

1,394,604.  Specification of Letters Patent.   Patented Oct. 25, 1921.

Application filed February 10, 1921. Serial No. 443,764.

*To all whom it may concern:*

Be it known that I, WILLIAM P. BOVARD, a citizen of the United States, residing at Mansfield, in the county of Richland and State of Ohio, have invented certain new and useful Improvements in a Method of Manufacturing Rail-Bonds, of which the following is a specification.

My invention relates to a rail bond used for connecting the adjacent ends of rails intended to conduct electric current and relates more particularly to the method of manufacturing such rail bonds.

I have in mind a rail bond which is composed of two dissimilar metals of quite different characteristics, these metals being preferably of copper and iron or steel, and I have in mind the uniting of these metals so as to produce a bond having no joints as such, that is no merely contacting surfaces but integrally united metals forming a path from one rail through the bond to the adjacent rail.

A bond composed of copper and steel or iron has advantages over a bond composed exclusively of steel or exclusively of copper and I am able to produce a bond which can be attached to the rail much more strongly than though the bond were of copper only, and which has a higher electrical conductivity than a bond composed of steel only, and my object has been to secure a method by which such a bond can be manufactured cheaply and economically; which can be installed economically and which method permits me to produce a bond of almost any shape desired.

I attain these objects by the various steps used in the manufacture of the bond described in this specification and illustrated in the accompanying drawing in which—

Figure 1:
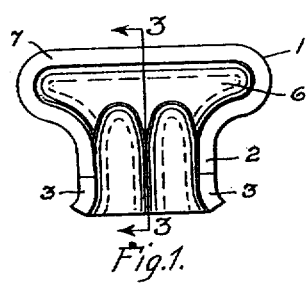
Figure 1 is a top plan view of that part of my bond which I prefer to make of iron or steel.
Figure 3:
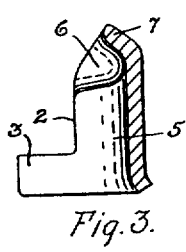
Fig. 3 is a section of the part shown in Fig. 1 on the line 3—3.
Figure 7:
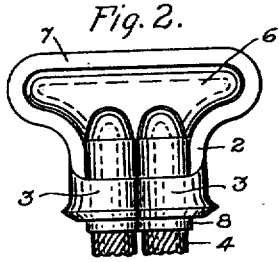
Fig. 7 shows the member shown in Fig. 1 with the bonding cable in position and the up-standing projections bent down into place.

In Fig. 1 I show one form of terminal which I propose to form up out of sheet metal, preferably steel or iron, the member 1 provided with a neck portion 2 and up-standing lugs 3 which are adapted to be folded down and in engagement with the conductor cable 4 as shown in Fig. 7. I prefer to make this member 1 of a stamping for the reason that the thickness is easily controlled by securing the proper thickness of metal and the parts produced are all of uniform size and shape and the cost is very low.

The member 1 is provided with the opening 5 to receive the cable 4 and is also provided with a recess 6 to receive the filling metal used in integrally uniting the cable 4 to the member 1. The up-standing wall 7 serves two purposes; namely, to help form the recess or pocket 6 and the external surface to act as a shelf upon which the metal used in attaching the bond to the rail is applied.

The member 1 having been formed up out of sheet metal preferably or from a casting of proper metal if desired, the ends of the cable 4 which have been previously cut off to the proper length and having applied to each end a sleeve 8 preferably of copper, is now positioned in the channel 5 and the up-standing lugs 3 are formed down into strong engagement with the sleeves 8 of the cable so as to mechanically hold the cable and sleeve rigidly and securely in position.

Figure 4:
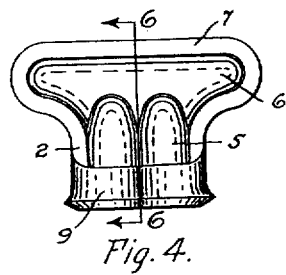
Fig. 4 is a modification of Fig. 1 in which the up-standing members 3 have been made in a closed position.
Figure 2:
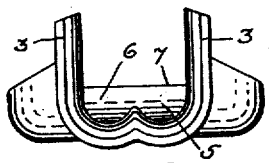
Fig. 2 is an end elevation of Fig. 1.
Figure 6:
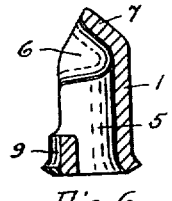
Fig. 6 is a sectional view of Fig. 4 on the line 6—6.
Figure 5:
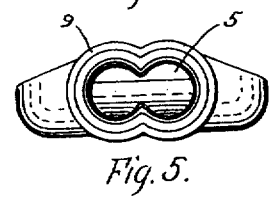
Fig. 5 is an end view of Fig. 4.

In Figs. 4, 5 and 6 are shown a modified form of terminal member 1 which is adapted to be formed from a casting preferably of malleable iron or a drop forging in which the channel 5 is formed complete and with this modified form of terminal the cable 4 with the sleeve 8 thereupon is inserted into the end of the opening 5 and the metal 9 surrounding the opening 5 is compressed into engagement with the sleeve and cable the same as in the member shown in Fig. 7.

Figure 8:
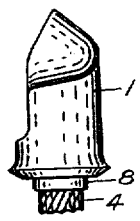
Fig. 8 is a side elevation of Fig. 7.
Figure 11:
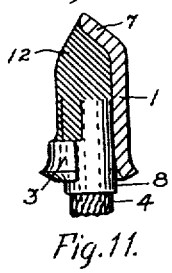
Fig. 11 is a section of the finished terminal in Fig. 10 on the line 11—11.
Figure 9:
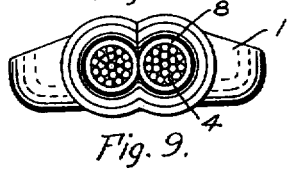
Fig. 9 is an end view of Fig. 7.

Having assembled the member 1, cable 4 and sleeve 8 as described and shown in Figs. 7, 8 and 9 with the end of the sleeve and cable projecting well into the member 1 but not into engagement with the wall 7, I proceed to unite the cable and sleeve to the interior face of the member 1 and to fill the recess or cavity 6 with metal in a molten condition and of a high conductivity such as copper or bronze.

Figure 10:
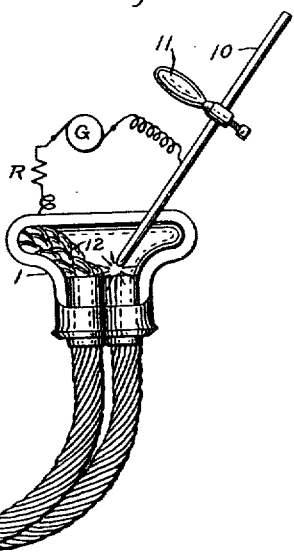
Fig. 10 shows the various parts of the bond in which the left hand terminal is that of the completed bond and the right hand terminal illustrates one of the final steps in producing the finished terminal.
Figure 12:
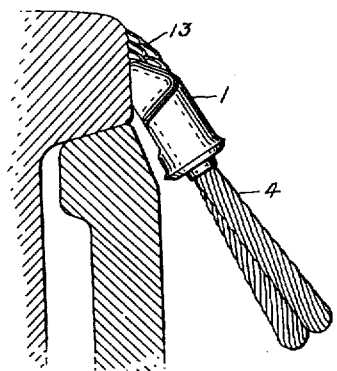
Fig. 12 shows one of the terminals of the finished bond secured to a rail.

The method I use is diagrammatically illustrated in the right hand terminal of Fig. 10 in which G represents a generator or source of supply of electric current; 10 is a metal electrode of the metal which is to unite the member 1 and cable and sleeve, and also fill the recess 6. A handle 11 is secured to the electrode 10 for use of the workman in handling the electrode 10. One terminal of the generator G is connected to the electrode 10 and the other terminal is connected to the member 1 or other part of the assembled parts and this is brought about through a resistance R if desired in order to control the amount of current flowing.

I first strike an arc between the cable and the electrode or the member 1 and the electrode at a point adjacent to the cable, and this arc immediately on account of its great intensity fuses the part and also the electrode 10 and the metal from the electrode 10 is deposited upon the fused spot of the part. This operation might be termed a thermal deposition of metal as the fusing of the part to which it is desired to apply the metal and the fusing of the electrode are carried out simultaneously and the fused metal of the electrode falling upon the fused part of the bond immediately unites therewith, forming an integral union. This thermal deposition of the electrode 10 is carried out in continuous increments whereby the cable 4 and sleeve 8 are integrally united to the fused metal from the electrode 10 and the fused metal of the electrode 10 is also integrally united to the member 1, and the process is continued until the parts 1, 4 and 8 are thoroughly and integrally united together through the medium of the fused electrode 10. To bring the conductivity of the bond up to as high a point as possible, the process of thermo-deposition is continued until all available space within the recess 6 is filled with metal fused from the electrode 10 and which is integrally united to the interior surface of the member 1.

I prefer to fill the recess 6 slightly above the up-standing wall 7 forming the recess and then take the bond terminal and heat the same to a red heat and place it under a drop hammer and drop the same, thereby compacting the thermo-deposited metal and smoothing off the exposed face of the deposited metal which is naturally left in a somewhat rough condition after its application. Should there be any excess of deposited metal, this will squeeze out between the dropping dies and form what is known as a flash which is easily trimmed off in any of the well known methods.

When this bond is applied to the rail the exposed face of the deposited metal is adjacent the rail face, and the exterior face of the steel member 1 is away from the rail and the outer surface of the wall 7 forms a shelf upon which the attaching metal 13 is caught and retained.

I am aware that other methods of applying the filling metal or filling the recess 6 and uniting the cable, sleeve and member 1 can be used, as for instance the oxy-acetylene flame, or the carbon arc, but I consider these equivalents of the preferred method which I have shown and described. I am also aware that other modifications may be made in this invention by those skilled in the art without departing from the invention. In uniting the various parts by deposition of fused metal simultaneously with heating or fusing the parts, I prefer not to heat or fuse the cable and member 1 to a point where they will run together and unite directly but prefer to secure them together through the medium of the thermo-deposited metal. The thermo-deposited metal will unite with the cable or member 1 if the temperature of the same is not up to the fusing point of the deposited metal but approximates the same and this condition can be controlled by means of the relative size of the electrode 10 to the other parts to be united.

I claim:—

1. The method of manufacturing a rail bond consisting of a ferrous member and a high conductivity cable united thereto comprising the steps of forming up a ferrous member with a recess and having a channel opening into the recess to receive the cable and having projecting lugs adjacent the channel to engage the cable, then inserting the cable into the channel, then securing the cable in position in the channel by bringing the lugs into strong engagement with the cable, then uniting the cable to the member and filling the recess by electro-thermo-deposition of a metal similar to that of the cable and fused to the cable and member.

2. A method of manfacturing rail bonds comprising the steps of first forming up a cup-shaped member of ferrous sheet metal having a side opening to receive the bond cable, then inserting the cable in the opening, then compressing a portion of the cup-shaped member about the cable to mechanically secure it in place, then uniting the cable to the cup-shaped member by thermo-deposition of a metal similar to the cable and then filling the cavity in the cup-shaped member by thermo-deposition of a fused metal similar to that uniting the cable to the member.

3. The method of manufacturing a rail bond comprising the steps of forming up a member having a recess therein and an opening to receive a bond cable, then inserting the bond cable into the opening with the ends thereof exposed in the recess, then uniting the end face of the cable to the member by thermo-deposition of a metal similar to that of the cable, then filling the space in the recess and securing the side faces of the cable within the member to the member by the thermo-deposition of a metal similar to the cable.

4. A method of manufacturing a rail bond comprising a ferrous member, a cable of high conductivity and a high conductivity member uniting the cable and ferrous member consisting of the steps of forming up a ferrous member of sheet metal having an open face recess and means to engage the cable, then inserting the cable ends into the recess, then bringing the engaging means into strong contact with the cable and then filling the recess and uniting the cable to the ferrous member by electro-thermo-deposition of a metal of high conductivity.

5. The method of manufacturing a rail bond consisting of a ferrous member and a high conductivity cable secured thereto comprising the steps of forming a recess in the ferrous member, then inserting the end of the cable into the recess, then securing the cable to the member within the recess by electro-thermo-deposition of a metal similar to that of the cable fused to the member and cable without fusing the cable to the member.

6. The method of manufacturing a rail bond consisting of a ferrous member and a high conductivity cable united thereto comprising the steps of forming a recess in the ferrous member, then inserting the end of the cable into the recess, then uniting the cable to the member and filling the recess by electro-thermo-deposition of a metal similar to the cable, the deposited metal being fused to the cable and member.

7. The method of manufacturing a rail bond consisting of a ferrous member and a high conductivity member united together comprising the steps of forming up a recess member of ferrous metal having an open side, then securing the cable thereto and then filling the recess with a metal of high conductivity by electro-thermo-deposition and simultaneously fusing the deposited metal while in a fused state to the interior of the ferrous member.

8. The method of manufacturing a rail bond consisting of a ferrous member and a high conductivity cable secured thereto comprising the steps of forming a recess in the member, then positioning the cable end in the recess, then uniting the cable to the member by the electro-thermo-deposition of an interposed metal similar to the metal in the cable and fused to the cable and to the interior surface of the member.

9. The method of manufacturing a rail bond terminal consisting of a ferrous metal member and a high conductivity metal member secured thereto comprising the steps of first forming up of sheet metal a ferrous shell having an open recess and projecting lugs, and then filling the recess with the high conductivity metal by electro-thermo-deposition applied in progressive increments and fused to the interior surface of the ferrous member.

10. The method of manufacturing a rail bond consisting of a composite terminal formed of a ferrous member and a dissimilar metal and a high conductivity cable secured thereto comprising the steps of forming up a ferrous member having a recess adapted to receive and retain a molten dissimilar metal, and having means for receiving and retaining the cable, then placing the cable in position relatively to the ferrous member and then heating the parts and filling the recess with a molten dissimilar metal of a higher conductivity than the ferrous member to unite the ferrous member and cable to form an integral union of the three members.

11. The method of manufacturing a rail bond consisting of a composite terminal formed of a ferrous member and a member of a dissimilar metal and having a cable secured thereto comprising the steps of first producing the ferrous member with means to receive the cable, then positioning the cable in place, then heating the parts and applying the dissimilar metal in a fused state and by progressive increments by thermo-deposition to the ferrous member and cable to unite the ferrous member to the cable and form a mass of the dissimilar metal fused to the ferrous metal.

In testimony whereof I affix my signature.

WILLIAM P. BOVARD.